J. A. O'BRIEN & G. N. HEALD.
PROSCENIUM CLOSURE AND PROJECTOR SCREEN.
APPLICATION FILED MAR. 12, 1913.
1,075,118.
Patented Oct. 7, 1913.
2 SHEETS—SHEET 1.
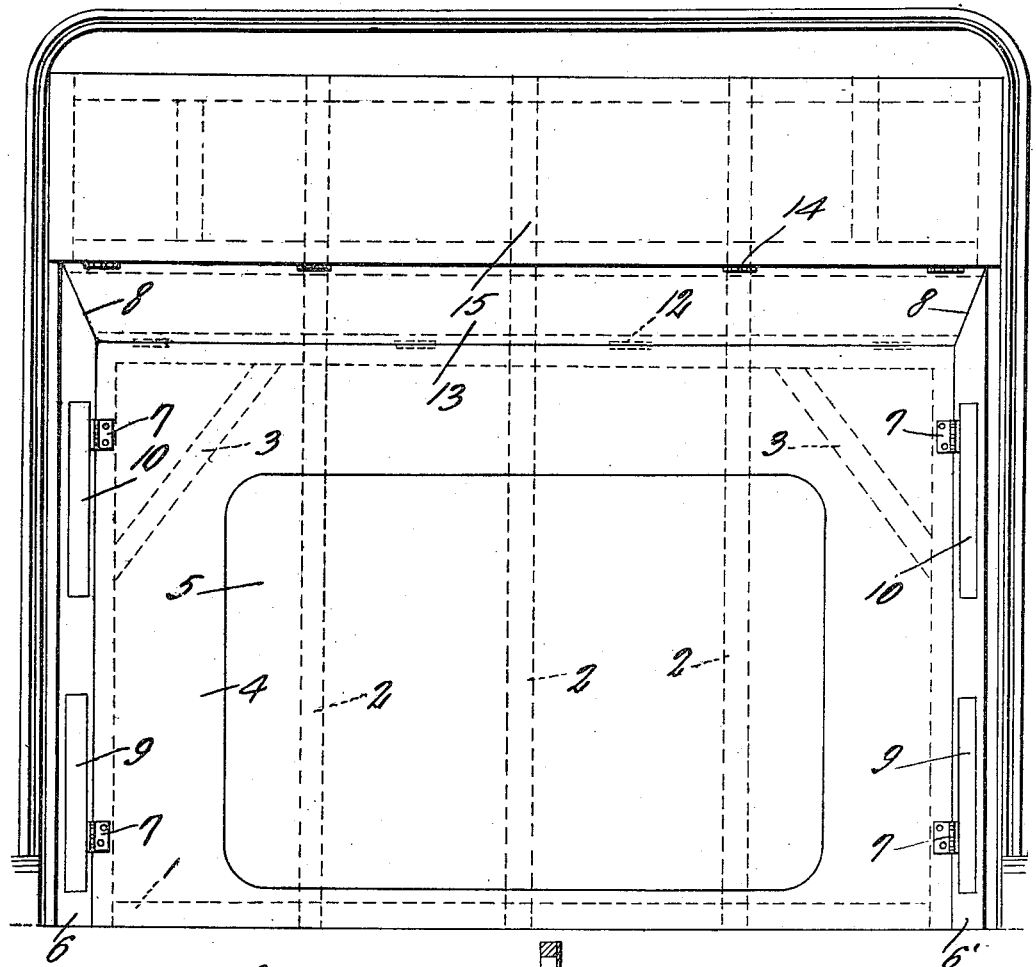
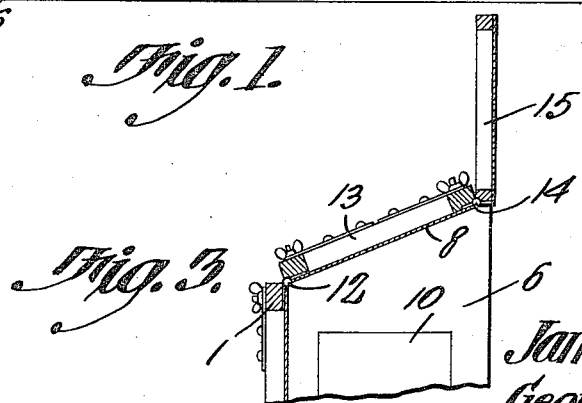
Witnesses
James A. O'Brien and
George N. Heald, Inventors
by C. A. Snow & Co.,
Attorneys J. A. O'BRIEN & G. N. HEALD.
PROSCENIUM CLOSURE AND PROJECTOR SCREEN.
APPLICATION FILED MAR. 12, 1913.
1,075,118.
Patented Oct. 7, 1913.
2 SHEETS—SHEET 2.
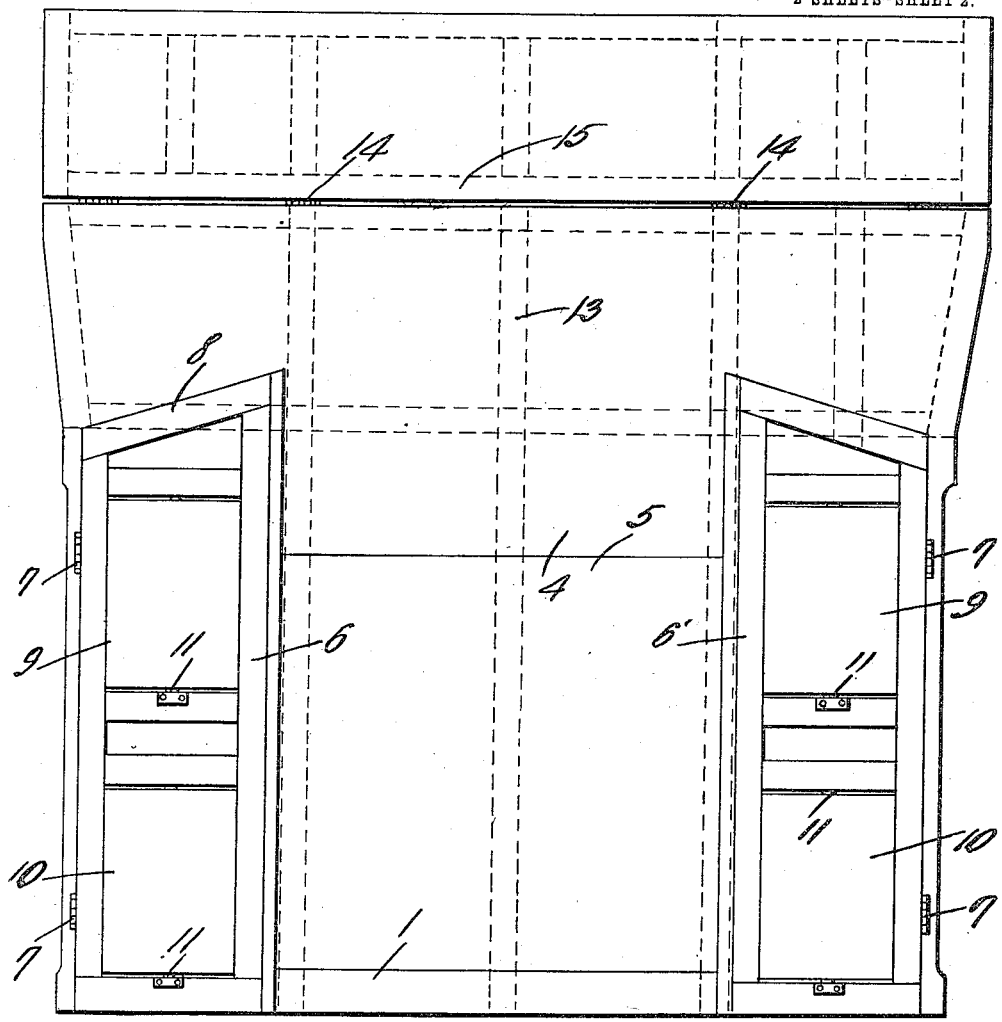
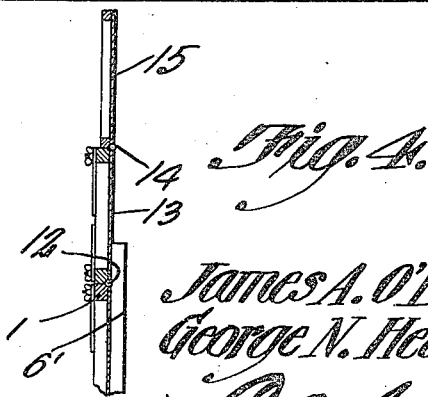
Witnesses
James A. O'Brien and
George N. Heald Inventors
by
Attorneys

UNITED STATES PATENT OFFICE.

JAMES A. O'BRIEN AND GEORGE N. HEALD, OF LEWISTON, MAINE.

PROSCENIUM-CLOSURE AND PROJECTOR-SCREEN.

1,075,118. Specification of Letters Patent. Patented Oct. 7, 1913.

Application filed March 12, 1913. Serial No. 753,837.

*To all whom it may concern:*

Be it known that we, JAMES A. O'BRIEN and GEORGE N. HEALD, citizens of the United States, residing at Lewiston, in the county of Androscoggin, State of Maine, have invented a new and useful Proscenium-Closure and Projector-Screen, of which the following is a specification.

The present invention relates to proscenium closures and projector screens, the primary object of the present invention, being the provision of a closure and screen of this character, which when properly positioned will fill the space and wing portion at the proscenium of a theater or the like, so that during the display or projection of motion pictures or lantern slides upon the screen, the operatives may work in full light instead of a dimmed light, or in the dark, behind the screen to set the scenes for a following performance, the present closure being collapsible and extensible, so that the same may be moved into and out of place similarly to a drop curtain.

A further object of the present invention, is the provision of a main screen carrying member having hingedly connected thereto, oppositely disposed wings which are adapted to be extended at the sides to close the wing portions at the entrance, in front of the closure, from the stage, and with a plurality of hinged members at the top, to coact with the end wings to seal the upper portion of the proscenium above the main screen or closure, the same being readily moved into proper position or extended to be removed similar to a drop curtain.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a front elevation of the present invention in use. Fig. 2 is a similar view of the same in the position it assumes when being elevated as a drop curtain. Fig. 3 is an enlarged detail sectional view through the closure and screen when closing the proscenium. Fig. 4 is a similar view when extended and ready to be elevated out of use.

Referring to the drawings, the numeral 1 designates the main central and carrying frame, which as shown in Fig. 1 is composed of vertical strips 2 and the bracing strips 3, all of the strips being covered by the flexible opaque covering 4 which supports the projector screen 5 of the usual material. The space about the screen 5 upon the portion 4 may be employed for displaying advertising signs or for any desired purpose. The side wings 6—6', are constructed similarly, and are hinged for inward and outward swinging movements to and from the body of the frame 1 by means of a plurality of hinges 7 which limit the outward extension of the wings 6—6', and permit the same to fold upon the frame 1 as indicated in Figs. 2 and 4.

Each section 6—6' is provided with the pivotally mounted closures 9 and 10, respectively, each one of which is pivoted centrally, as at 11, so that the same may be rotated, and each one of the said closures is provided with a screen of material which prevents the admission of the actinic rays from the calcium light through either one of the wings that would produce an undesirable effect upon the front portion of the screen 5, said closure being so arranged in the wings as to permit of the employment of the light at the wings of the proscenium during the resetting of the scenes back of the present closure and during the projection of motion pictures or lantern slides upon the screen 5.

Hingedly connected to the upper edge of the main frame 1 by means of a plurality of hinges 12, is the inclined section or vertically swinging wing 13, which is disposed to engage the upper inclined edges of the wings 6—6', and thus be maintained in the inclined position, as shown in Fig. 3, when the closure is in use, or to be extended vertically, as shown in Figs. 2 and 4, when the closure is being elevated or lowered similarly to a drop curtain.

Hingedly connected by means of hinges 14 to the forward edge of the section or wing 13, is the wing 15, to which is connected the ropes or tackle for elevating and lowering the closure, the same normally assuming the vertical position, as shown in Figs. 1 and 3, when the closure is in position and thus forming a screen or closure for the upper portion of the proscenium whereby all light from the rear of the closure is excluded from the front of the closure, so as not to in any way detrimentally effect the projection of the motion pictures or lantern slides upon the screen 5.

From the foregoing description, taken in connection with the drawings, it is evident that by providing a closure, as herein set forth, that the same may be readily hoisted to and from the fly of the stage, and that by reason of the fact that the wings 6—6' may be extended obliquely to the main frame 1, that the side wings at the proscenium are closed, to prevent the introduction or projection of light from the rear and side of the stage upon the forward portion of the screen, the upper hinged sections 13 and 15 closing the upper portion of the proscenium, and thus completely excluding any light from the rear through the proscenium into the main part of the theater.

By the sections being hinged, as shown, it is evident that the closure may be readily placed in position as it is simply necessary to collapse the wings 6—6', as illustrated in Figs. 2 and 4. The sections 15 and 13 will be extended as the same are elevated to lift the closure in the fly of the theater.

What is claimed is:

1. A proscenium closure, including a main section, two oppositely disposed sections hingedly connected thereto for movement to and from the main section, said hinged sections being capable of being disposed at an oblique angle to the body of the main section, and a longitudinally disposed section hingedly connected to the upper edge of the main section for movement to and from the upper edge of the hinged sections.

2. A proscenium closure, including a main section, two oppositely disposed sections hingedly connected thereto for movement to and from the main section, said hinged sections being capable of being disposed at an oblique angle to the body of the main section, a longitudinally disposed section hingedly connected to the upper edge of the main section for movement to and from the upper edge of the wing section, and an auxiliary section hingedly connected to the longitudinally disposed section and for disposition in a plane parallel to the main section when the side wings and longitudinally disposed sections are in coactive relation.

3. A proscenium closure, including a main frame, a projector screen carried thereby, two oppositely disposed wing sections hingedly connected to the main section for movement to and from the main frame, the upper edges of said wing sections being inclined from the rear upwardly to the front edge thereof, and a longitudinally disposed wing section hingedly connected to the upper edge of the main section for movement to and from the upper edge of the wing sections the same when in engagement with the inclined edges thereof, being disposed at an oblique angle to the main section.

4. A proscenium closure, including a main section, a projector screen carried thereby, two oppositely disposed wing sections hingedly connected to the main section for movement to and from the main frame, the upper edges of said wing sections being inclined from the rear upwardly to the front edge thereof, a longitudinally disposed wing section hingedly connected to the upper edge of the main section for movement to and from the upper edge of the wing section, the same when in engagement with the inclined edges thereof, being disposed at an oblique angle to the main section, and an auxiliary longitudinally disposed section hingedly connected to the longitudinally hinged section and disposed to remain in a plane parallel to the plane of the main section.

5. A proscenium closure having a plurality of hinged sections connected to the respective side edges and top edge, the top section constituting a means for elevating and lowering the closure into and out of proscenium closing position.

6. A proscenium closure, including a main section carrying a projector screen, two hinged wing sections connected to opposite edges of the main section for movement to and from the main section, said wing sections when in proscenium closure position being disposed outwardly at an oblique angle to the body of the main section, a longitudinally disposed wing section hingedly connected to the upper edge of the main section and disposed to coact with the upper edges of the side wing sections to form an obliquely disposed closure at the top of the main section.

7. A proscenium closure, including a main section carrying a projector screen, two hinged wing sections connected to opposite edges of the main section for movement to and from the main section, said wing sections when in proscenium closure position being disposed outwardly at an oblique angle to the body of the main section, a longitudinally disposed wing section hingedly connected to the upper edge of the main section and disposed to coact with the upper edges of the side wing sections to form an obliquely disposed closure at the top of the main section, and a longitudinally disposed wing section hingedly connected to the remaining long edge of the first longitudinally disposed wing section, the same being disposed to be in parallel with the plane of the main section when in extended or collapsed position.

In testimony that we claim the foregoing as our own, we have hereto affixed our signatures in the presence of two witnesses.

JAMES A. O'BRIEN.
GEORGE N. HEALD.

Witnesses:
DANA S. WILLIAMS,
MICHAEL J. HAGERTY.

Copies of this patent may be obtained for five cents each, by addressing the "Commissioner of Patents, Washington, D. C."